United States Patent
Litke et al.

(10) Patent No.: US 9,632,703 B2
(45) Date of Patent: Apr. 25, 2017

(54) PEER TO PEER VOLUME MERGE AND DELETE IN A SHARED STORAGE ENVIRONMENT

(71) Applicant: Red Hat, Inc., Raleigh, NC (US)

(72) Inventors: Adam Litke, Bethel Park, PA (US); Federico Simoncelli, Fano (IT)

(73) Assignee: Red Hat, Inc., Raleigh, NC (US)

( * ) Notice: Subject to any disclaimer, the term of this patent is extended or adjusted under 35 U.S.C. 154(b) by 17 days.

(21) Appl. No.: 14/615,411

(22) Filed: Feb. 5, 2015

(65) Prior Publication Data

US 2016/0231944 A1 Aug. 11, 2016

(51) Int. Cl.
G06F 3/06 (2006.01)

(52) U.S. Cl.
CPC .......... G06F 3/0608 (2013.01); G06F 3/067 (2013.01); G06F 3/0644 (2013.01); G06F 3/0652 (2013.01); G06F 3/0659 (2013.01); G06F 3/0665 (2013.01)

(58) Field of Classification Search
CPC .... G06F 2201/84; G06F 3/065; G06F 3/0665; G06F 3/0608; G06F 2201/815; G06F 9/45558; G06F 2009/45562; G06F 2009/4557; G06F 3/0652; G06F 3/0662; G06F 3/0644; G06F 3/0659; G06F 3/067
See application file for complete search history.

(56) References Cited

U.S. PATENT DOCUMENTS

| | | | |
|---|---|---|---|
| 8,705,342 B2 | 4/2014 | Yu et al. | |
| 2006/0041580 A1 | 2/2006 | Ozdemir et al. | |
| 2012/0054306 A1 | 3/2012 | Vaghani et al. | |
| 2014/0040580 A1 | 2/2014 | Kripalani | |
| 2014/0095823 A1 | 4/2014 | Shaikh et al. | |
| 2014/0130055 A1 | 5/2014 | Guha | |
| 2014/0149347 A1 | 5/2014 | Ben-Shaul et al. | |
| 2014/0149983 A1* | 5/2014 | Bonilla | G06F 9/45558 718/1 |
| 2015/0032699 A1* | 1/2015 | Fujita | G06F 11/1451 707/649 |

(Continued)

OTHER PUBLICATIONS

No Author, "How to Manually Merge Hyper-V Snapshots into a Single VHD," I.T. Proctology Blogspot, retrieved on Jan. 2, 2015, Jun. 7, 2008, 22 pages, Internet: <http://itproctology.blogspot.in/2008/06/how-to-manually-merge-hyper-v-snapshots.htm>.

(Continued)

Primary Examiner — Hashem Farrokh
(74) Attorney, Agent, or Firm — Lowenstein Sandler LLP

(57) ABSTRACT

A processing device receives a request to delete a snapshot of a virtual machine. The processing device identifies a volume chain of a virtual disk in a shared storage that includes a destination storage volume and a source storage volume. The snapshot is associated with the destination storage volume. The processing device instructs a host machine to merge data of the source storage volume with data of the destination storage volume. The processing device receives an indication from the host machine that the data of the source storage volume has been merged into the data of the destination storage volume. The processing device instructs a storage server to remove the source storage volume from the shared storage.

17 Claims, 4 Drawing Sheets

(56) References Cited

U.S. PATENT DOCUMENTS

| | | | | |
|---|---|---|---|---|
| 2015/0347165 A1* | 12/2015 | Lipchuk | ................... | G06F 8/63 |
| | | | | 718/1 |
| 2015/0378636 A1* | 12/2015 | Yadav | ................... | G06F 3/0626 |
| | | | | 711/165 |
| 2016/0103738 A1* | 4/2016 | Forgette | ............ | G06F 17/30088 |
| | | | | 707/639 |
| 2016/0103739 A1* | 4/2016 | Huang | ..................... | G06F 9/50 |
| | | | | 714/19 |

OTHER PUBLICATIONS

No Author, "Merging a Snapshot with the Source Logical Volume to Revert Changes or Roll Back to a Previous State," Suse Doc: Storage Administration Guide, retrieved on Jan. 2, 2015, 2 pages, Internet: <https://www.suse.com/documentation/sles11/stor_admin/data/lvconvert_merge.htm>.

No Author, "Peer Motion on HP LeftHand Storage," HP Technical White Paper, Apr. 2012, 16 pages, Hewlett-Packard Development Company, L.P.

* cited by examiner

US 9,632,703 B2

PEER TO PEER VOLUME MERGE AND DELETE IN A SHARED STORAGE ENVIRONMENT

TECHNICAL FIELD

Embodiments of the present disclosure relate to virtual machines and, more specifically, to a peer to peer volume merge and delete in a shared storage environment.

BACKGROUND

A virtual machine (VM) may be a software-based emulation of computer hardware. For example, the VM may operate based on computer architecture and functions of computer hardware resources associated with hard disks or other such memory. A virtual disk that emulates a hard disk or memory may be used by the VM. Thus, the VM may emulate a physical computing environment, and requests for a hard disk or memory may be managed by a virtualization layer which translates these requests to the underlying physical computing hardware resources. The virtualization layer may be part of a virtual machine management application that manages the virtual disk.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
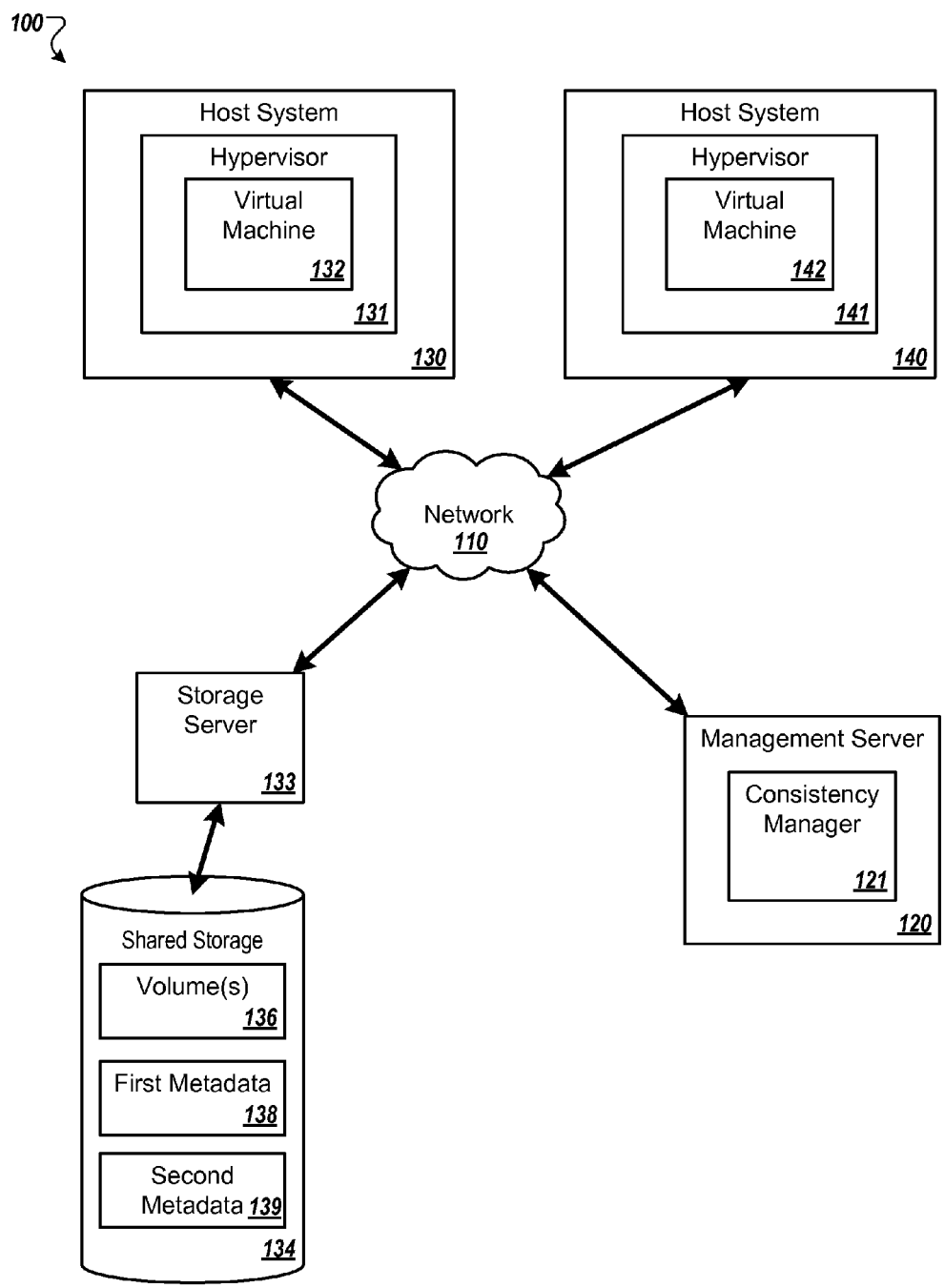
FIG. 1 illustrates an example system architecture in which embodiments of the disclosure may operate.

Aspects of the present disclosure relate to peer to peer volume merge and delete in a shared storage environment. The volume may be associated with a virtual machine. The virtual machine (VM) may be based on a virtual disk (also referred to as a virtual disk image) that is based on a series of snapshots. A snapshot may refer to a copy of the virtual disk at a particular point in time. For example, when a change is made to the virtual disk after the snapshot has been created, the snapshot may include a copy of the changed area of the virtual disk as it was prior to the change so that a prior state of the virtual disk may be reconstructed (e.g., by discarding only the changes made after the snapshot was created).

The virtual disk may be based on a series of volumes associated with snapshots. Each snapshot and the contents of the original virtual disk may each be stored on separate volumes and the virtual disk may be based on the series or chain of the volumes. Such a series of snapshots and the original virtual disk may also be referred to as the volume chain. For example, a first snapshot may be created based on the virtual disk and subsequent changes to the virtual disk may be recorded in a new volume associated with the first snapshot. A second snapshot may be based on the first snapshot and subsequent changes to the first snapshot may then be recorded in a second new volume associated with the second snapshot. Further, a third snapshot may then be based on the second snapshot and subsequent changes to the second snapshot may be saved in a third new volume associated with the third snapshot. Thus, the virtual disk may based on a series of the original virtual disk, the first volume with the first snapshot, the second volume with the second snapshot, and the third volume with the third snapshot. The final or last volume of the chain may be used to store current changes that are made to the virtual disk by the virtual machine since the last snapshot was created. The last volume may be referred to as the active volume.

A merge operation may be performed on the virtual disk. In some embodiments, a live merge operation may refer to an operation performed on a virtual disk to change the series of volumes of the virtual disk as a virtual machine is writing or creating changes to the last volume of the virtual disk. For example, as previously described, the virtual disk may be based on a volume chain. A live merge operation may merge or combine data from two of the volumes in the volume chain. For example, data from the final volume of the series of volumes (e.g., a source volume) may be merged into the previous volume of the series of volumes (e.g., a destination volume). The source volume is a child to the destination volume. The merging or combining of the volumes may result in the adding of the changed data that has been recorded in the child volume to the parent volume as well as current changes made by the VM to the virtual disk being saved in the parent volume as opposed to being saved in the child volume of the volume chain. The merge operation may be performed by a host machine that includes a virtual machine that uses the virtual disk. After the merge operation is complete, a storage server may perform cleanup operations to remove the child volume from the shared storage. In some embodiments, the host machine and the storage server may be referred to as peers.

Aspects of the present disclosure may prevent the corruption of a virtual disk by ensuring that a merge operation has completed before the host machine unlinks a source volume from a volume chain, and ensuring that the source volume has been unlinked before it is removed from a shared storage. For example, to maintain data consistency and to avoid corrupting the virtual disk, a consistency manager coordinates the merge and unlink of the source volume by the host machine and the removal of the source volume associated with the snapshot by the storage server.

FIG. 1 is an example system architecture 100 for various implementations of the disclosure. The system architecture 100 may include host systems 130 and 140 coupled to one or more storage servers 133 via a network 110. The network 110 may be a public network (e.g., the Internet), a private network (e.g., a local area network (LAN) or wide area network (WAN)), or a combination thereof. Network 110 may include a wireless infrastructure, which may be provided by one or multiple wireless communications systems, such as a wireless fidelity (WiFi) hotspot connected with the network 110 and/or a wireless carrier system that can be implemented using various data processing equipment, communication towers, etc.

The host systems 130 and 140 may each include a hypervisor (e.g., hypervisors 131 or 141) that are each associated with a virtual machine (e.g., virtual machine 132 and virtual machine 142). The host systems 130 or 140 may include, but are not limited to, desktop computers, laptop computers, rackmount servers, routers, switches, tablet computers, mobile phones, or any other type of computing device. The host systems 130 and 140 may include hardware resources that may include one or more processing devices, memory, and/or additional devices including, but not limited to, a graphics card, hardware RAID controller, network controller, hard disk drive, universal serial bus (USB) device, internal input/output (I/O) device, keyboard, mouse, speaker, etc. The hardware resources may be used to execute software, including one or more operating systems, virtual machines (e.g., a virtual machine based on a mobile communications device), or other applications.

The hardware resources of a host system may provide one or more services such as, but not limited to, networking services, storage services, and software libraries. In some embodiments, the hypervisor (e.g., hypervisor 131 or 141), also referred to as a virtual machine monitor (VMM) and/or a virtual machine (e.g., virtual machine 132 or 142) may use the one or more services that are provided by the host system. The hypervisors 131 or 141 is an application that executes on a host system 130 or 140 to manage virtual machines 132 or 142. In particular, the hypervisor may instantiate or start, migrate, pause, or perform another type of event associated with virtual machines 132 and 142. For example, the hypervisor 131 or 141 may perform a live merge operation for a virtual disk used by the virtual machine 132 or 142. In some embodiments, the hypervisor 131 or 141 may further coordinate metadata changes in the system architecture 100, such as creating and deleting virtual disk images, identifying relationships (e.g., parent, child) between snapshots and/or storage volumes, creating and merging snapshots within a volume chain 136, and copying images between storage domains. In some embodiments, the hypervisor 131 or 141 may update metadata 138 for one or more volumes in a volume chain identified in a virtual disk image file that is stored at a shared storage 134. The shared storage 134 can include any number of storage devices that can be used by any number of hosts (e.g., hosts 130, 140).

As shown in FIG. 1, the system architecture 100 may further include a management server 120. In some embodiments, the management server 120 may manage the use of the hardware resources of the host systems 130 and 140 as well as aspects of the storage servers 133 and 143 and the corresponding server storage device 134. The management server 120 may include a consistency manager 121 that may coordinate a live merge operation for volumes 136 of a virtual disk in the shared storage 134.

Each of the hypervisor 131, 141 and the management server 120 may create and modify data that identifies the series of volumes upon which a virtual disk is based. For example, the hypervisor 131, 141 may manage the virtual disk file and a header of the virtual disk file may include information that identifies the volume chain information and parent/child information for each volume of the virtual disk. Such data managed by the hypervisor may be referred to as first metadata 138 of the virtual disk. Further, the management server 120 may store second metadata 139 (e.g., data in another file stored at the same storage device as the virtual disk file) that also identifies volume chain information and parent/child information for each volume of the virtual disk. Each of the hypervisor 131, 141 and the management server 120 may update its respective metadata 138, 139 of the series of volumes of the virtual disk in response to a merge operation that is performed on the virtual disk while the virtual machine is currently writing data to the virtual disk (i.e., the live merge operation).

In operation, the management server 120 may receive a request to delete a snapshot that is associated with either a destination volume of a virtual disk used by the virtual machine 132 running on host 130 or a source volume of the virtual disk. The consistency manager 121 may instruct the hypervisor 131 to perform a live merge operation to merge the source volume into a destination volume of the virtual disk. The destination volume may be a parent of the source volume. Upon completing the live merge operation, the hypervisor 131 or 141 may send a notification to the consistency manager 121 that the live merge operation is complete. The hypervisor 131, 141 may also update the first metadata 138 to unlink the source volume from the volume chain. In response to receiving the notification, the consistency manager 121 may determine whether the source volume has been unlinked from the volume chain in view of the success or failure of the live merge operation. The consistency manager 121 may access, the first metadata 138 to determine whether the live merge operation was a success. For a successful live merge operation, the first metadata 138 does not identify the source volume as being in the volume chain because a successful live merge operation would include the hypervisor 131, 141 unlinking the source volume from the volume chain. An unsuccessful live merge operation would result in the source volume still being listed in the first metadata 138. When the first metadata 138 does not include the source volume, the consistency manager 121 determines that it is safe to remove the source volume from the shared storage 134 and causes the source volume to be removed, such as by requesting that the storage server 133 remove the source volume from the volumes 136 in the shared storage 134.

The consistency manager 121 can also check to determine whether the source volume was unlinked from the shared storage 134. To perform such a check, the consistency manager 121 can send a request to the storage server 133 for information regarding any volumes that are children of the destination volume. The storage server 133 can query the first metadata 138 for such information. The storage server 133 can send information of any children of the destination volume that were indicated in the first metadata 138 to the consistency manager 121. When the source volume is not listed as a child of the destination volume, then the consistency manager 121 can determine that the source volume has been unlinked from the volume chain.

Figure 2:
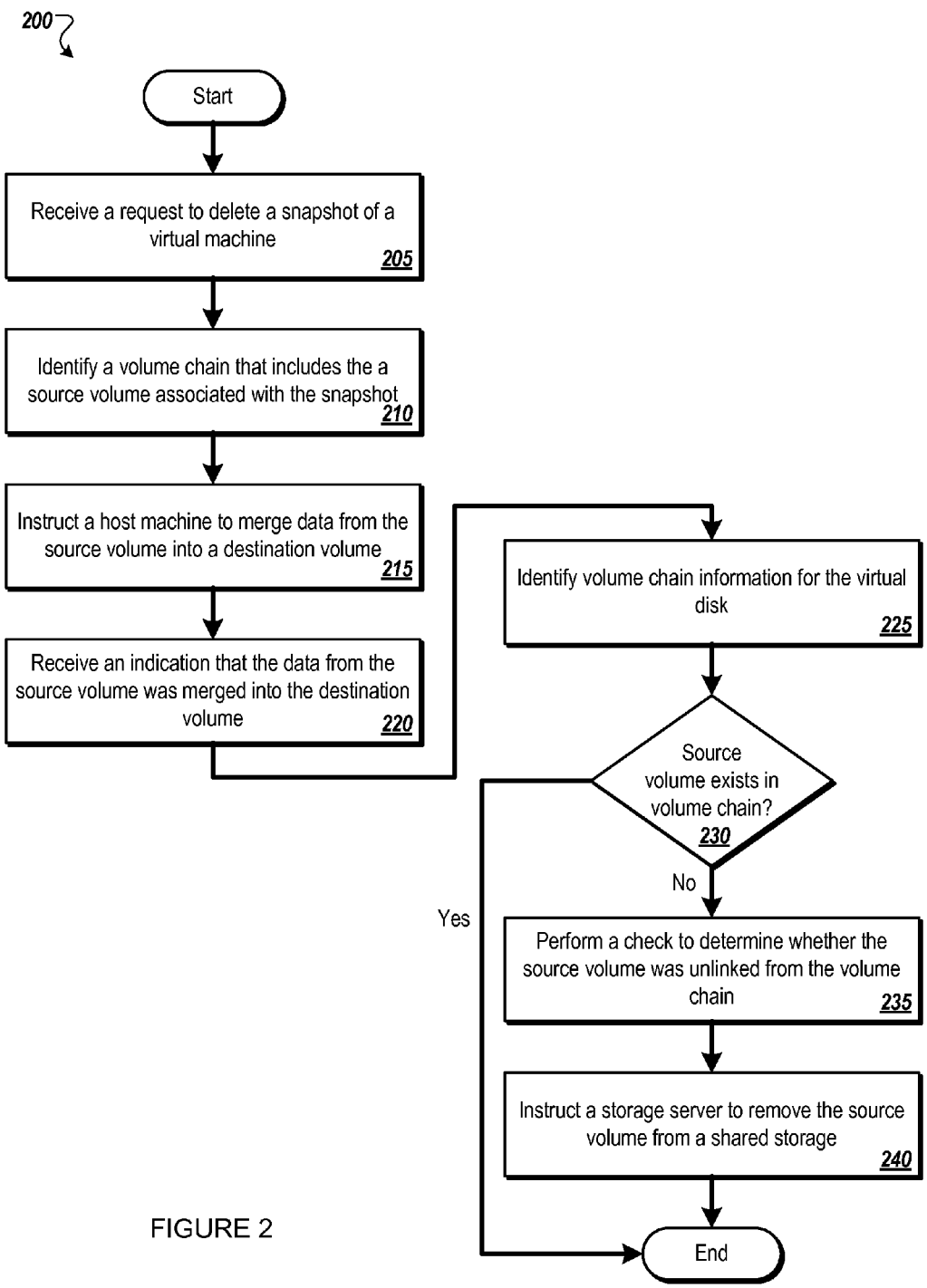
FIG. 2 is a flow diagram of an example method for peer to peer volume merge and delete in a shared storage environment in accordance with some embodiments.

FIG. 2 is a flow diagram of an example method 200 for peer to peer volume merge and delete in a shared storage environment. The method 200 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 200 may be performed by a consistency manager 121 of a management server 120 as described with relation to FIG. 1.

As shown, the method 200 may begin by the processing logic receiving a request to delete a first snapshot at block 205. The request can be from a user or can be machine-generated, such as part of an operation to cleanup snapshots.

At block 210, the processing logic identifies a volume chain of a virtual disk in a shared storage. The shared storage may include a source storage volume and a destination storage volume. The snapshot to be deleted may be associated with the source storage volume.

At block 215, the processing logic instructs a host machine (e.g., host machine 130 of FIG. 1) to merge data of the source storage volume with data of the destination storage volume and to remove the snapshot. Once the host machine has completed the merge operation and has unlinked the source volume from the volume chain, the host machine can send a notification that the merge operation is complete.

At block 220, the processing logic receives an indication from the host machine (e.g., the notification) that the data of the source storage volume has been merged into the data of the destination storage volume. In some embodiments, the processing logic does not receive an indication that the source volume was unlinked from the volume chain.

To determine whether the source volume was unlinked from the volume chain, at block 225 the processing logic can identify volume chain information for the virtual disk. In some embodiments, the processing logic can access metadata (e.g., first metadata 138 of FIG. 1) to identify any volume chain information that is maintained by the host machine, as described herein.

At block 230, the processing logic determines whether the volume chain information includes the source storage volume. When the volume chain information includes the source storage volume, then the processing logic can infer that the source storage volume was not unlinked from the volume chain. When the volume chain information does not include the source storage volume, then the processing logic can infer that the source storage volume was unlinked from the volume chain.

Figure 3:
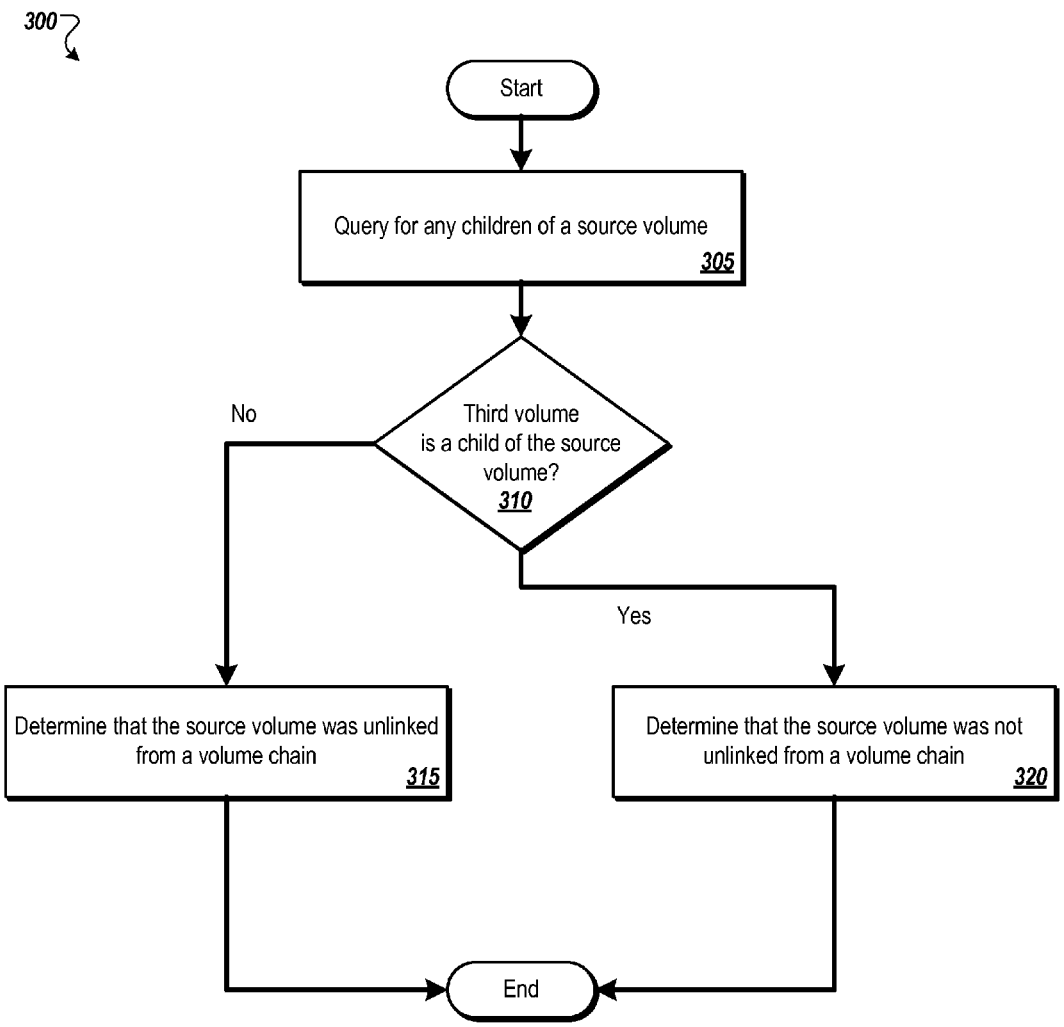
FIG. 3 is a flow diagram of an example method for determining whether a volume was unlinked from a volume chain in accordance with some embodiments of the disclosure.

At block 235, the processing logic can perform a check to determine whether the destination volume was unlinked from the volume chain, as further described in conjunction with FIG. 3. At block 240, the processing logic instructs a storage server to remove the source storage volume from the shared storage in response to determining that the source storage volume was unlinked from the volume chain.

FIG. 3 is a flow diagram of an example method 300 for determining whether a source volume was unlinked from a volume chain. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a consistency manager 121 of a management server as described with relation to FIG. 1.

As shown, the method 300 may begin by the processing logic accessing volume chain information that may identify any children associated with a source volume in a volume chain of a virtual disk. For example, the volume may be the destination volume, as described in conjunction with FIG. 2, and the volume chain information may be metadata 138, as described in conjunction with FIG. 1. In some embodiments, determining whether the source storage volume is a parent to any storage volumes of the virtual disk in the shared storage includes inspecting a header of a third storage volume to determine the parent of the third storage volume.

When the processing logic does not identify a source volume as being a parent of the any volumes in the volume chain information at block 310, the processing logic can infer that the source volume has been unlinked from the volume chain at block 315. Inferring the unlinking of the source volume can validate a process to remove a live snapshot and associated source volume, as further described in conjunction with FIG. 2.

Figure 4:
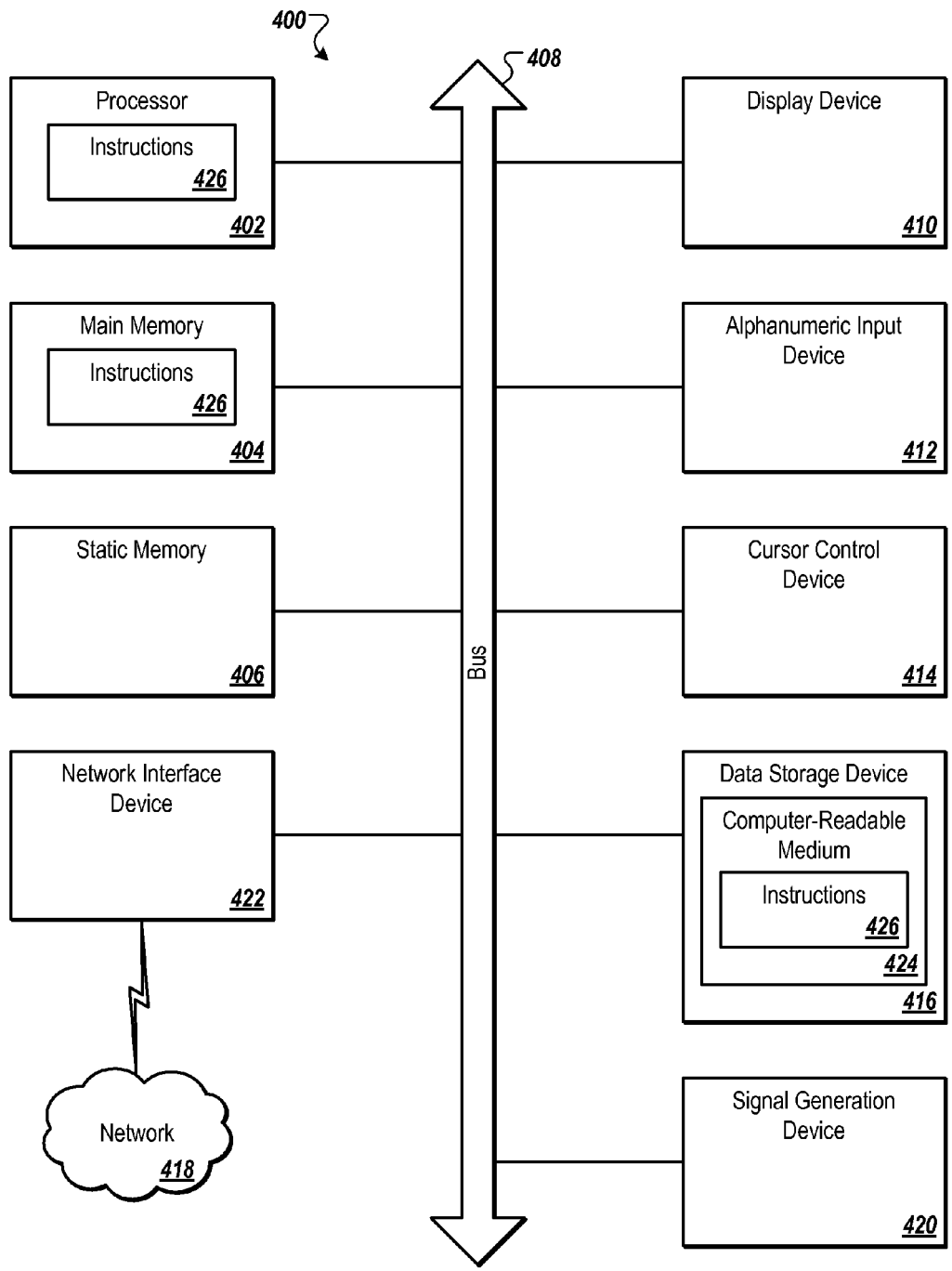
FIG. 4 illustrates a block diagram of an embodiment of a computer system in which some embodiments of the disclosure may operate.

When the processing logic identifies at least one child of the source volume at block 310 using the volume chain information, the processing logic can infer that the source volume has not been unlinked from the volume chain at block 320. By inferring that the source volume has not been deleted, the processing logic can also determine that it is not safe to delete a live snapshot and associated volume from a shared storage. FIG. 4 illustrates a diagrammatic representation of a machine in the example form of a computer system 400 within which a set of instructions, for causing the machine to perform any one or more of the methodologies discussed herein, may be executed. The computer system 400 may correspond to the management server 120 or host system 130, 140 of FIG. 1. In embodiments of the present invention, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 416 (e.g., a data storage device), which communicate with each other via a bus 408.

The processing device 402 represents one or more general-purpose processors such as a microprocessor, central processing unit, or the like. The term "processing device" is used herein to refer to any combination of one or more integrated circuits and/or packages that include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 402 may therefore include multiple processors. The processing device 402 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 400 may further include one or more network interface devices 422 (e.g., NICs). The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The secondary memory 416 may include a machine-readable storage medium (or more specifically a computer-readable storage medium) 424 on which is stored one or more sets of instructions 454 embodying any one or more of the methodologies or functions described herein (e.g., consistency manager 121). The instructions 454 may also reside, completely or at least partially, within the main memory 404 and/or within the processing device 402 during execution thereof by the computer system 400; the main memory 404 and the processing device 402 also constituting machine-readable storage media.

While the computer-readable storage medium 424 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine that cause the machine to perform any one or more of the methodologies of the present invention. The term "computer-readable storage medium" shall accordingly be taken to include, but not be limited to, non-transitory media such as solid-state memories, and optical and magnetic media.

The modules, components and other features described herein can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "probing", "establishing", "detecting", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving a request to delete a snapshot of a virtual machine;
   identifying a volume chain of a virtual disk in a shared storage that comprises a destination storage volume and a source storage volume, the snapshot being associated with either the source storage volume or the destination storage volume;
   instructing, by a processing device, a host machine to perform a merge operation to merge data of the source storage volume with data of the destination storage volume and to delete the snapshot;
   receiving an indication from the host machine that the data of the source storage volume has been merged into the data of the destination storage volume;
   instructing a storage server to remove the source storage volume from the shared storage;
   requesting volume chain information for the virtual disk from the host machine in response to receiving the indication from the host machine that the data of the source storage volume has been merged into the data of the destination storage volume; and
   determining that the data of the source storage volume was merged with data of the destination storage volume when the volume chain information does not include the source storage volume.

2. The method of claim 1, wherein the volume chain information is updated to unlink the source volume from the volume chain in view of a hypervisor associated with the virtual machine and in response to a completed merge operation associated with the virtual disk.

3. The method of claim 1, wherein the merge operation is performed while the virtual machine writes new data to the virtual disk.

4. The method of claim 1 further comprising determining whether the source storage volume is a parent to any storage volumes of the virtual disk in the shared storage.

5. The method of claim 4 further comprising:
  determining that the source storage volume has been unlinked from the volume chain when the volume chain information does not include any children of the source storage volume; and
  determining that the source storage volume has not been unlinked from the volume chain when volume chain information includes at least one child of the source storage volume.

6. The method of claim 4, wherein determining whether the source storage volume is a parent to any storage volumes of the virtual disk in the shared storage comprises inspecting a header of a third storage volume to determine the parent of the third storage volume.

7. The method of claim 1, wherein the volume chain comprises a series of snapshots associated with the virtual disk.

8. A system comprising:
  a memory; and
  a processing device operatively coupled with the memory to:
    receive a request to delete a snapshot of a virtual machine, the snapshot being associated with either a source storage volume or a destination storage volume;
    instruct a host machine to perform a merge operation to merge data of the source storage volume with data of the destination storage volume and to delete the snapshot;
    receive an indication from the host machine that the data of the source storage volume has been merged into the data of the destination storage volume;
    instruct a storage server to remove the source storage volume from a shared storage;
    request volume chain information for a virtual disk from the host machine in response to receiving the indication from the host machine that the data of the source storage volume has been merged into the data of the destination storage volume; and
    determine that the data of the source storage volume was merged with data of the destination storage volume when the volume chain information does not include the source storage volume.

9. The system of claim 8, wherein the volume chain information is updated to unlink the source volume from a volume chain in view of a hypervisor associated with the virtual machine and in response to a completed merge operation associated with the virtual disk.

10. The system of claim 8, the processing device further to identify a volume chain of a virtual disk in the shared storage that comprises the destination storage volume and the source storage volume.

11. The system of claim 8, the processing device further to determine whether the source storage volume is a parent to any storage volumes of a virtual disk in the shared storage.

12. The system of claim 11, the processing device further to:
  determine that the source storage volume has been unlinked from a volume chain when the volume chain information does not include any children of the source storage volume; and
  determine that the source storage volume has not been unlinked from the volume chain when volume chain information includes at least one child of the source storage volume.

13. The system of claim 11, wherein to determine whether the source storage volume is a parent to any storage volumes of the virtual disk in the shared storage, the processing device is to inspect a header of a third storage volume to determine the parent of the third storage volume.

14. A non-transitory machine-readable storage medium comprising instructions that, when accessed by a processing device, cause the processing device to:
  receive a request to delete a snapshot of a virtual machine, the snapshot being associated with either a source storage volume or a destination storage volume;
  instruct a host machine to perform a merge operation to merge data of the source storage volume with data of the destination storage volume and to delete the snapshot;
  receive an indication from the host machine that the data of the source storage volume has been merged into the data of the destination storage volume;
  instruct a storage server to remove the source storage volume from a shared storage;
  request volume chain information for a virtual disk from the host machine in response to receiving the indication from the host machine that the data of the source storage volume has been merged into the data of the destination storage volume; and
  determine that the data of the source storage volume was merged with data of the destination storage volume when the volume chain information does not include the source storage volume.

15. The non-transitory machine-readable storage medium of claim 14, wherein the volume chain information is updated to unlink the source volume from the volume chain in view of a hypervisor associated with the virtual machine and in response to a completed merge operation associated with the virtual disk.

16. The non-transitory machine-readable storage medium of claim 14, wherein the merge operation is performed while the virtual machine writes new data to the virtual disk.

17. The non-transitory machine-readable storage medium of claim 14, the processing device further to determine whether the source storage volume is a parent to any storage volumes of a virtual disk in the shared storage.

* * * * *